(12) United States Patent
Norbeck et al.

(10) Patent No.: US 8,590,329 B2
(45) Date of Patent: *Nov. 26, 2013

(54) MEDIUM VOLTAGE POWER CONTROLLER

(75) Inventors: Dean K. Norbeck, Marco Island, FL (US); John C. Hansen, Spring Grove, PA (US)

(73) Assignee: Johnson Controls Technology Company, Holland, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/491,120

(22) Filed: Jun. 7, 2012

(65) Prior Publication Data
US 2012/0240614 A1  Sep. 27, 2012

Related U.S. Application Data

(63) Continuation-in-part of application No. 13/078,317, filed on Apr. 1, 2011, which is a continuation of application No. 12/040,063, filed on Feb. 29, 2008, now Pat. No. 7,918,099, which is a continuation of application No. 11/314,148, filed on Dec. 21, 2005, now Pat. No. 7,353,662.

(60) Provisional application No. 60/638,828, filed on Dec. 22, 2004, provisional application No. 61/494,681, filed on Jun. 8, 2011.

(51) Int. Cl.
*F25B 1/00*   (2006.01)

(52) U.S. Cl.
USPC .......................................... 62/228.1; 62/498

(58) Field of Classification Search
USPC ........ 62/228.1, 259.1, 298, 478, 498; 310/94, 310/98; 415/17, 19
See application file for complete search history.

(56) References Cited

U.S. PATENT DOCUMENTS

| 2,246,845 | A | * | 6/1941 | Durden | ............................ 62/192 |
| 2,290,984 | A | | 7/1942 | McCoy, Jr. | |
| 2,739,458 | A | | 3/1956 | Newton | |
| 3,057,172 | A | | 10/1962 | Ditzler | |
| 3,112,618 | A | * | 12/1963 | Weller | ............................. 62/117 |
| 3,293,876 | A | | 12/1966 | Geisler | |
| 3,380,262 | A | | 4/1968 | Miner | |
| 3,739,596 | A | | 6/1973 | Ballard | |
| 3,818,983 | A | | 6/1974 | Grandia | |
| 3,838,581 | A | * | 10/1974 | Endress | ........................... 62/468 |
| 3,959,704 | A | | 5/1976 | McCrea | |
| 4,006,603 | A | * | 2/1977 | Miles | ............................... 62/229 |

(Continued)

FOREIGN PATENT DOCUMENTS

JP    200148552 A    2/2001

*Primary Examiner* — Mohammad M Ali

(74) *Attorney, Agent, or Firm* — McNees Wallace & Nurick LLC

(57) ABSTRACT

A medium voltage power controller box is mounted on a chiller unit with the other components of the chiller system. The power controller box can be positioned on the chiller system unit to permit the power controller box to be close coupled to the motor, and specifically to the main motor lead exit hub without the need for any power conduit connections between the power controller box and the motor. In addition, the power controller box also does not require any control interface and receives controls from a control panel. A short conduit connection between the control panel and the power controller box is used to provide the necessary connections between the control panel and the power controller box.

24 Claims, 17 Drawing Sheets

(56) References Cited

U.S. PATENT DOCUMENTS

| | | | |
|---|---|---|---|
| 4,024,444 A * | 5/1977 | Dewan et al. ............... 318/805 |
| 4,084,406 A * | 4/1978 | Brenneman .................. 62/211 |
| 4,398,400 A | 8/1983 | Bar |
| 4,438,383 A | 3/1984 | Etheridge |
| 4,669,279 A * | 6/1987 | Maeda et al. ................. 62/505 |
| 4,787,211 A | 11/1988 | Shaw |
| 4,895,005 A | 1/1990 | Norbeck et al. |
| 4,965,658 A | 10/1990 | Norbeck et al. |
| 5,006,682 A | 4/1991 | Sloff et al. |
| 5,058,389 A | 10/1991 | Yasuda et al. |
| 5,086,621 A * | 2/1992 | Starner et al. .................. 62/84 |
| 5,182,919 A * | 2/1993 | Fujiwara ...................... 62/193 |
| 5,396,784 A * | 3/1995 | Huenniger .................... 62/471 |
| 5,553,997 A | 9/1996 | Goshaw et al. |
| 5,563,489 A | 10/1996 | Murry |
| 5,655,380 A | 8/1997 | Calton |
| 5,675,978 A * | 10/1997 | Hamm et al. .................. 62/84 |
| 5,838,144 A | 11/1998 | Wills et al. |
| 5,963,420 A | 10/1999 | Bailey et al. |
| 5,970,733 A | 10/1999 | Hamaoka et al. |
| 6,065,297 A * | 5/2000 | Tischer et al. .................. 62/84 |
| 6,208,111 B1 | 3/2001 | Williams |
| 6,330,806 B1 | 12/2001 | Beaverson et al. |
| 6,375,439 B1 | 4/2002 | Missio |
| 6,395,985 B1 | 5/2002 | Djeddah |
| 6,427,464 B1 | 8/2002 | Beaverson et al. |
| 6,558,905 B1 | 5/2003 | van Dijk et al. |
| 6,564,560 B2 | 5/2003 | Butterworth et al. |
| 6,586,905 B1 | 7/2003 | Johnson |
| 6,679,076 B1 * | 1/2004 | Duga et al. ................... 62/228.1 |
| 6,691,531 B1 | 2/2004 | Martinez et al. |
| 6,783,080 B2 | 8/2004 | Antoniou et al. |
| 6,822,866 B2 | 11/2004 | Fearing et al. |
| 2003/0078742 A1 | 4/2003 | VanderZee et al. |
| 2004/0012983 A1 | 1/2004 | Fearing et al. |
| 2004/0016245 A1 | 1/2004 | Pierson |
| 2004/0035127 A1 | 2/2004 | Adaniya et al. |
| 2004/0035851 A1 | 2/2004 | Antoniou et al. |
| 2004/0107711 A1 | 6/2004 | Sastry |
| 2004/0107718 A1 | 6/2004 | Bowman et al. |
| 2006/0256488 A1 | 11/2006 | Benzing et al. |
| 2010/0327799 A1 | 12/2010 | Broussard et al. |

* cited by examiner

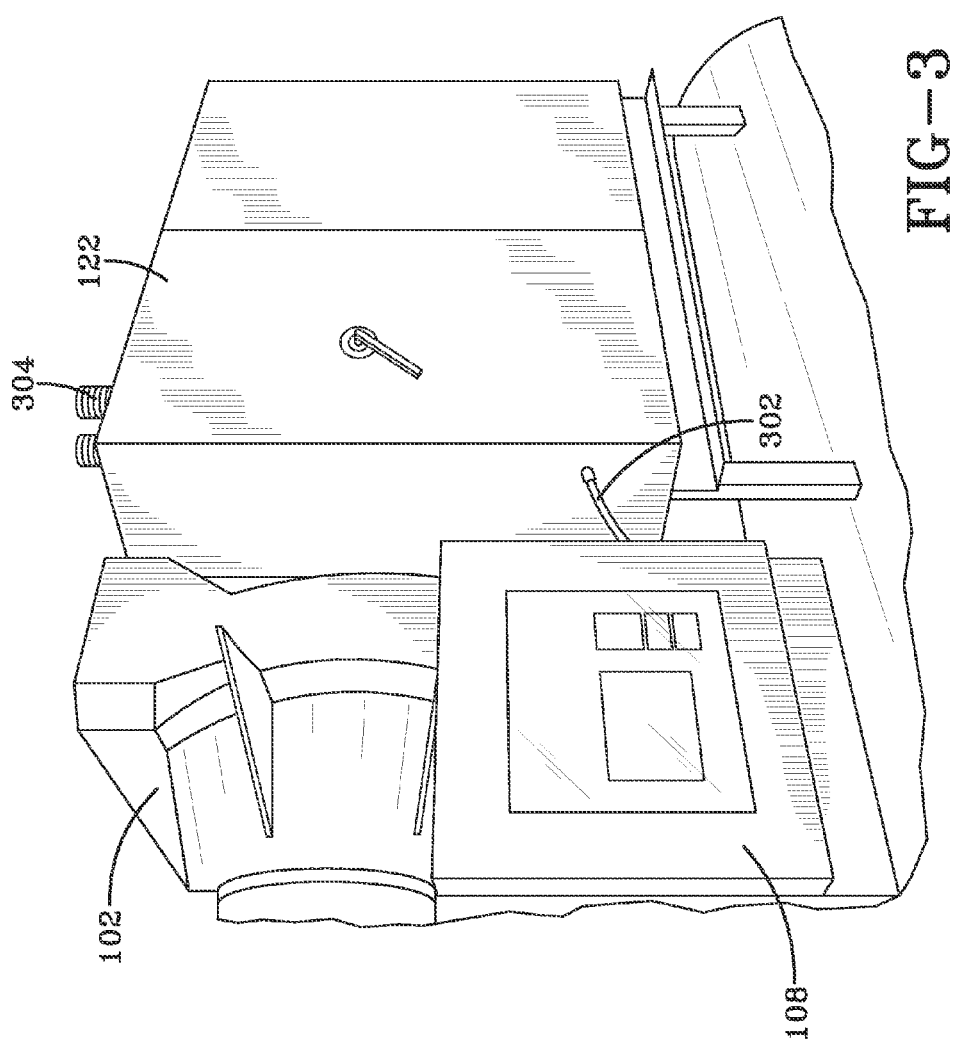

MEDIUM VOLTAGE POWER CONTROLLER

CROSS-REFERENCE TO RELATED APPLICATIONS

This application is a continuation in part of U.S. application Ser. No. 13/078,317, entitled MEDIUM VOLTAGE STARTER FOR A CHILLER UNIT, filed Apr. 1, 2011, which is a continuation of U.S. application Ser. No. 12/040,063, entitled MEDIUM VOLTAGE STARTER FOR A CHILLER UNIT, filed Feb. 29, 2008, which is a continuation of U.S. application Ser. No. 11/314,148, entitled MEDIUM VOLTAGE STARTER FOR A CHILLER UNIT, filed Dec. 21, 2005, which claims priority from and the benefit of U.S. Provisional Application No. 60/638,828, entitled MEDIUM VOLTAGE STARTER FOR A CHILLER UNIT, filed Dec. 22, 2004 and this application claims priority from and the benefit of U.S. Provisional Application No. 61/494,681, entitled MEDIUM VOLTAGE POWER CONTROLLER, filed Jun. 8, 2011, all of which applications are hereby incorporated by reference.

BACKGROUND

The present invention relates generally to medium voltage power controllers and, specifically, to medium voltage, solid-state, power controllers for a chiller or HVAC system. The term "power controller" as used herein can refer to either or both of starters and variable speed drives.

In low voltage chiller systems, the starter box for the compressor motor can be mounted directly on the chiller system as discussed in U.S. Pat. No. 4,895,005, which patent is hereby incorporated by reference. However, for a medium voltage chiller system, the power controller box, i.e., the starter box and/or the variable speed drive box, for the compressor is typically mounted on the floor either next to the chiller system or in a separate equipment room because of the larger size of the power controller box, which size can typically be greater than 100 cubic feet.

One of the reasons for mounting the power controller box on the floor for medium voltage chiller systems is that medium voltage can be up to forty to fifty times greater than low voltage. The larger voltages used in medium voltage applications can create a more difficult working environment because the electrical strike distance and creep distance are much longer than in a low voltage environment. The longer strike and creep distances require larger electrical spacings and the use of protective equipment for the mounting of components that result in a larger power controller box. In addition, the devices used for the medium voltage power controller box must be designed for the larger voltages associated with medium voltage, which also contributes to a larger power controller box. In other words, the physical size of the box or cabinet, as caused by electrical spacing, strike and creep distances and the need to cool the electrical components, may be significant.

One attempt that has been made to mount medium voltage starter components on a chiller system is described in U.S. Pat. No. 6,679,076 to Duga et al. The Duga et al. system discusses the use of two starter boxes mounted on the chiller system for specific sizes of chiller systems and with specific unit mounting locations. The two starter boxes in the Duga et al. system are interconnected by wiring and conduit. One major drawback of the two box arrangement in the Duga et al. system is that it involves complicated and expensive wiring arrangements in order to interconnect the starter boxes and the motor.

Therefore, what is needed is a medium voltage, solid-state power controller for a chiller system that can be mounted on or near the chiller system without an electrical conduit connection between the medium voltage motor and a box of the power controller.

SUMMARY

The present invention is directed to a system including a compressor, a condenser and an evaporator in fluid communication. The compressor, condenser and evaporator are mounted as a structure. The system includes a motor connected to the compressor to drive the compressor. The motor is mounted on the structure and the motor is powered by a voltage greater than 600 volts. The system also includes an enclosure having all components used in starting and operating the motor at variable speeds. The enclosure and components are configured for operation at voltages greater than 600 volts. The enclosure is mounted on the structure near the motor to permit electrical connections between the enclosure and the motor.

The present invention is also directed to a system including a compressor, a condenser and an evaporator in fluid communication. The compressor, condenser and evaporator are mounted to form an integral unit. The system includes a motor connected to the compressor to drive the compressor. The motor is mounted on the unit and the motor is powered by a voltage greater than 600 volts and less than 25,000 volts. The system includes a control panel being mounted on the unit and at least one box used in starting and operating the motor at a fixed speed or variable speed. The at least one box is mounted on the unit near the motor. The at least one box includes a power controller positioned in the at least one box. The power controller includes at least one silicon controlled rectifier, gate turn off device, field effect transistor, or insulated gate bipolar transistor. The power controller is electrically connected to the motor and the power controller is configured for operation at voltages in a range between 600 volts and 25,000 volts. The at least one box includes a disconnect switch being electrically connectable to a power source supplying a voltage greater than 600 volts and less than 25,000 volts, a first electrical switch connected between the disconnect switch and the power controller, and a second electrical switch connected in parallel with the power controller between the first electrical switch and the motor to bypass the power controller after the motor is started. The first electrical switch is operable to be opened and closed in response to control instructions received from the control panel. The first electrical switch is configured for operation at voltages in a range between 600 volts and 25,000 volts. The second electrical switch is configured for operation at voltages in a range between 600 volts and 25,000 volts. The at least one box is mounted on the unit to permit electrical connections between the box and the motor without a separate power conduit connection between the box and the motor.

The present invention is further directed to a system including a compressor, a condenser and an evaporator being integrally mounted as a unit and a motor connected to the compressor to drive the compressor. The motor is mounted on the unit. The system includes a control panel mounted on the unit and a variable speed drive controlled by the control panel. The variable speed drive is configured to provide voltages to the motor in a range between 600 volts and 25,000 volts to operate the motor at variable speeds. The variable speed drive is mounted on the unit near the motor. The variable speed drive is mounted on the unit to permit electrical connections between the variable speed drive and the motor without a power conduit connection between the variable speed drive and the motor.

One embodiment of the present application is directed to a chiller system having a compressor, a condenser and an evaporator connected in a closed refrigerant loop. The compressor, condenser and evaporator are integrally mounted to form a chiller system unit. The chiller system also includes a medium voltage motor connected to the compressor to drive the compressor. The medium voltage motor is mounted on the chiller system unit. The chiller system has a control panel to control operation of the chiller system and a single starter box and/or a single or multi box variable speed drive having all the components used in starting and operating the medium voltage motor. The control panel is mounted on the chiller system unit and the power controller box(es) can be mounted on the chiller system unit adjacent to the medium voltage motor. The power controller box (or one of the power controller boxes) is mounted on the chiller system to permit a close coupling of electrical connections between the power controller box and the medium voltage motor without a power conduit connection between the power controller box and the medium voltage motor.

Another embodiment of the present application is directed to a chiller system having a compressor, a condenser and an evaporator connected in a closed refrigerant loop. The compressor, condenser and evaporator are integrally mounted to form a chiller system unit. The chiller system also has a medium voltage motor connected to the compressor to drive the compressor and a control panel to control operation of the chiller system. The medium voltage motor and the control panel are mounted on the chiller system unit. The chiller system further has a single starter box and/or a single or multi box variable speed drive used in starting and operating the medium voltage motor. The power controller box(es) can be mounted on the chiller system unit adjacent to the medium voltage motor.

In one embodiment, the power controller box includes a starter with a solid state starter device including at least one silicon controlled rectifier, a manually operated main disconnect switch, a first electrical switching arrangement connected between the manually operated main disconnect switch and the solid state starter device, and a bypass arrangement including a second electrical switching arrangement. The solid state starter device is electrically connected to the medium voltage motor. The manually operated main disconnect switch is electrically connected to a medium voltage power source. The first electrical switching arrangement is configured to be opened and closed in response to control instructions received from the control panel. The bypass arrangement is connected in parallel with the solid state starter device between the first electrical switching arrangement and the medium voltage motor to bypass the solid state starter device after the medium voltage motor is started. Finally, the power controller box is mounted on the chiller system to permit a close coupling of electrical connections between the starter box and the medium voltage motor without a power conduit connection between the power controller box and the medium voltage motor.

In another embodiment, the power controller box(es) can include a variable speed drive with a manually operated main disconnect switch or contactor, a first electrical switching arrangement or rectifier device including at least one diode, IGBT, FET or similar device connected between the manually operated main disconnect switch or contactor and a DC filter, followed by a second electrical switching arrangement including at least one IGBT or similar device. The manually operated main disconnect switch is electrically connected to a medium voltage power source. The first electrical switching arrangement is configured to be opened and closed to convert the AC main power to DC. The DC filter smoothes the resulting DC power. The second electrical switching arrangement, in response to control instructions received from a control panel, converts the DC power back to variable frequency AC to control the speed of the motor connected to the output of the drive. Finally, the power controller box(es) can be mounted on the chiller system to permit a close coupling of electrical connections between the power controller box and the medium voltage motor without a separate power conduit connection between the power controller box and the medium voltage motor. In an alternate embodiment, one power controller box can be mounted on the floor (or wall or other mounting platform) near the chiller system and a second power controller box can be mounted on the chiller system in a manner to avoid the use or requirement of an electrical conduit connection between the second power controller box and the medium voltage motor.

Still another embodiment of the present application is directed to a chiller system having a compressor, a condenser and an evaporator connected in a closed refrigerant loop. The compressor, condenser and evaporator are integrally mounted to form a chiller system unit. The chiller system also has a medium voltage motor connected to the compressor to drive the compressor. The medium voltage motor is mounted on the chiller system unit. Finally, the chiller system has a control arrangement that consists of a control panel to control operation of the chiller system and a power controller box controlled by the control panel and includes all components used in starting and operating the medium voltage motor. The control panel is mounted on the chiller system unit and the power controller box is mounted on the chiller system unit adjacent to the medium voltage motor. The power controller box is mounted on the chiller system to permit a close coupling of electrical connections between the power controller box and the medium voltage motor without a separate power conduit connection between the power controller box and the medium voltage motor.

One advantage of the present application is that it provides a compact, space saving, power controller for chiller motors that can easily be incorporated on a chiller system unit.

Another advantage of the present application is that it saves equipment room floor space.

Still another advantage of the present application is that fewer materials, e.g., sheet metal, conduit connections, electrical connectors, conduit, etc., are required for the chiller system.

Still another advantage of the present application is the elimination of damaging electrical signals and noise that may harm the electrical motor, bearings, or other sensitive electronic equipment due to long cable length.

A further advantage of the present application is that unit mounting of the variable speed drive requires no additional floor space and permits factory wiring and testing.

Another advantage of the present application is that the power controller box is positioned off the floor by several feet and does not obstruct the water boxes present on all chillers thereby permitting tube cleaning or single pass water connections.

Other features and advantages of the present application will be apparent from the following more detailed description of the preferred embodiment, taken in conjunction with the accompanying drawings which illustrate, by way of example, the principles of the invention.

BRIEF DESCRIPTION OF THE DRAWINGS

FIG. 3 shows a perspective view of an embodiment of the power controller box and control panel being mounted on a chiller system.

Wherever possible, the same reference numbers will be used throughout the drawings to refer to the same or like parts.

DETAILED DESCRIPTION OF THE EXEMPLARY EMBODIMENTS

Figure 1:
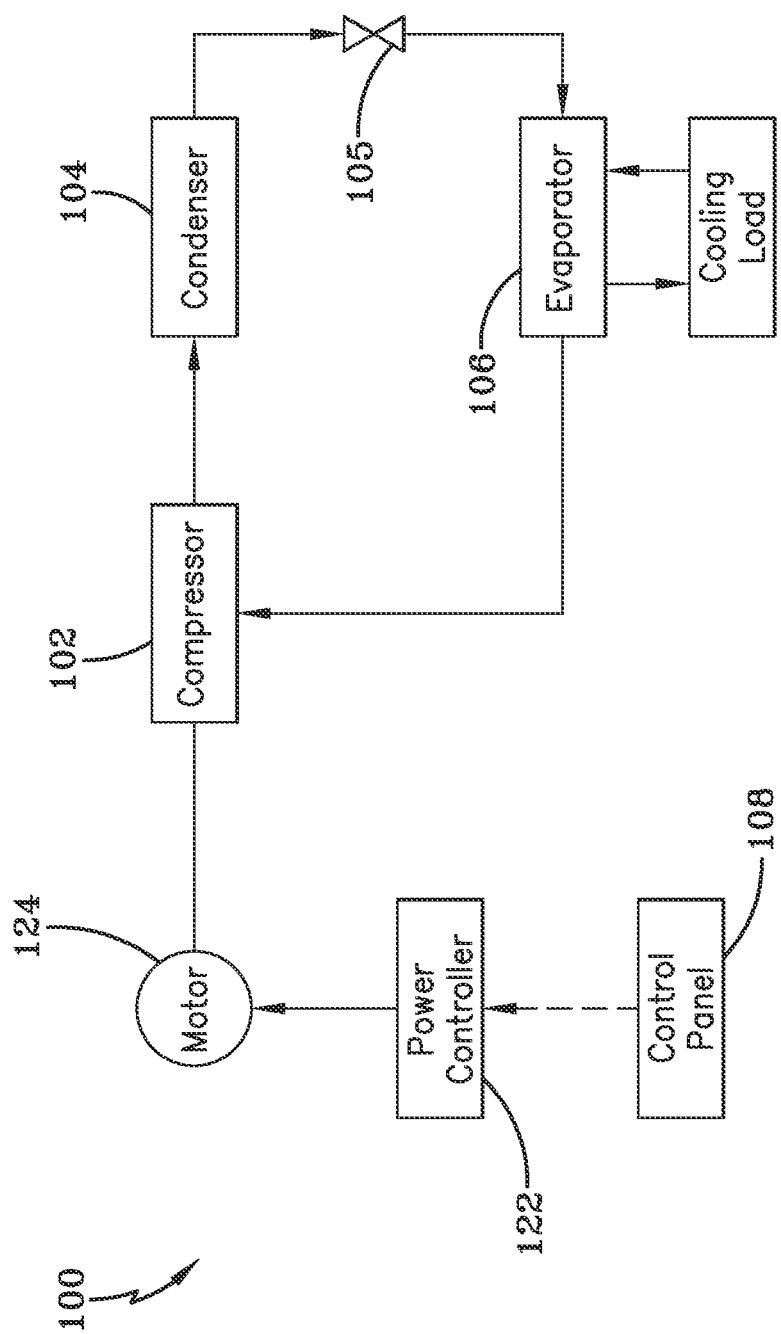
FIG. 1 shows schematically an embodiment of a chiller system.

FIG. 1 illustrates generally an embodiment of an HVAC, refrigeration or liquid chiller system 100. As shown in FIG. 1, the HVAC, refrigeration or liquid chiller system 100 includes a compressor 102, a condenser 104, expansion device(s) 105, a liquid chiller or evaporator 106 and a control panel 108. A motor 124 can be used to drive the compressor 102, and a power controller box, cabinet or enclosure 122 is close coupled to the motor 124 to start and/or operate the motor 124. The motor 124 and the power controller box 122 can be configured for medium voltage operation, e.g., operation at greater than about 600 volts (V) and less than or equal to about 25 kilovolts (kV). In another exemplary embodiment, medium voltage may be defined by IEEE Std. 1623-2004 or ANSI/IEEE 1585-2002 (these two standards refer to medium voltage as 1 kV to 35 kV). The compressor 102, condenser 104, expansion device(s) 105, evaporator 106, control panel 108, motor 124 and the power controller box 122 can be all mounted together as a structure or integrally mounted to form a chiller system unit.

The motor 124 can be a fixed speed motor, but, in another embodiment can be a variable speed motor. In the embodiment where the motor 124 is a variable speed motor, the power controller box 122 can include a variable speed drive configured for operation at medium voltage in order to operate the motor 124 at variable speeds.

The compressor 102, driven by the motor 124, compresses a refrigerant vapor and delivers the vapor to the condenser 104 through a discharge line. The compressor 102 can be a centrifugal compressor in one embodiment, but in other embodiments can be any suitable type of compressor, e.g., screw compressor, reciprocating compressor, etc. The refrigerant vapor delivered by the compressor 102 to the condenser 104 enters into a heat exchange relationship with a fluid, e.g. water or air, and undergoes a phase change to a refrigerant liquid as a result of the heat exchange relationship with the fluid. The condensed liquid refrigerant from the condenser 104 flows through an expansion device 105 to an evaporator 106.

The evaporator 106 can include connections for a supply line and a return line of a cooling load. A secondary liquid or process fluid, e.g. water, ethylene glycol, calcium chloride brine or sodium chloride brine, travels into the evaporator 106 via the return line and exits the evaporator 106 via the supply line. The liquid refrigerant in the evaporator 106 enters into a heat exchange relationship with the process fluid to lower the temperature of the process fluid. The refrigerant liquid in the evaporator 106 undergoes a phase change to a refrigerant vapor as a result of the heat exchange relationship with the process fluid. The vapor refrigerant in the evaporator 106 exits the evaporator 106 and returns to the compressor 102 by a suction line to complete the cycle. It is to be understood that any suitable configuration of the condenser 104 and evaporator 106 can be used in the system 100, provided that the appropriate phase change of the refrigerant in the condenser 104 and evaporator 106 is obtained.

The control panel 108 can include an analog to digital (A/D) converter, a microprocessor, a non-volatile memory, and an interface board to control operation of the system 100. The control panel 108 can execute a control algorithm(s) to control operation of the power controller box 122, including the power sections of a variable speed drive. The control of the power controller box 122 by the control panel 108 can provide an operator of the system 100 with a single interface point for controlling the system 100. In one embodiment, the control algorithm(s) can be one or more computer programs or software stored in the non-volatile memory of the control panel 108 and can include a series of instructions executable by the microprocessor of the control panel 108. While the control algorithm can be embodied in a computer program(s) and executed by the microprocessor, it is to be understood that the control algorithm may be implemented and executed using digital and/or analog hardware by those skilled in the art. If hardware is used to execute the control algorithm(s), the corresponding configuration of the control panel 108 can be changed to incorporate the necessary components and to remove any components that may no longer be required.

As discussed above, the control panel 108 can execute a control algorithm(s) to control operation of the power controller box 122, including the power sections of a variable speed drive. In one embodiment, the control panel 108 can provide all of the controls for the components in the power controller box 122 and thus, the power controller box 122 does not require any operator control interface or corresponding control components. However, in another embodiment, the control panel 108 can provide just control commands or control signals, e.g., start commands, stop commands, speed commands, etc., to the power controller box 122 and receive data from the components of the power controller box 122 regarding the operation of the power controller box 122, i.e., a data acquisition function. In the embodiment where the power controller box 122 receives control commands, the power controller box 122 again does not have any operator control interface, but may have corresponding control components to process the control commands from the control panel 108.

The power controller box 122 can be mounted on the chiller system unit with the other components of the chiller system 100. In one exemplary embodiment, to permit the power controller box 122 to be mounted on the chiller system 100, the power controller box 122 can have a size of between about 40 cubic feet and about 400 cubic feet. However, it is to be understood that larger sized power controller boxes, i.e., boxes greater than 400 cubic feet, can also be mounted on the chiller system.

FIGS. 3-7 illustrate embodiments of mountings of the control panel 108 and/or the power controller box 122 on the chiller system unit. The control panel 108 and the power controller box 122 can be mounted on one or both of the system shells, i.e., the condenser shell 104 or the evaporator shell 106, of the chiller system unit. A short electrical connection 302 between the control panel 108 and the power controller box 122 is used to provide the necessary connections between the control panel 108 and the power controller box 122. In addition, the power controller box 122 is placed on the chiller system unit to permit the power controller box 122 to be directly or close coupled (less than a foot) to the motor 124 and specifically to the main motor lead exit hub (not shown), without the need for any power conduit connections between the power controller box 122 and the motor 124. The only power conduit connection that is needed is the connection 304 between the building electrical service, i.e., the medium voltage power supply or source, and the power controller box 122. In another embodiment, the power controller box 122 can still be mounted on the chiller system unit but not in a position to provide the close coupling to the motor 124. In this embodiment, a power conduit can be used to connect the motor 124 and the power controller box 122.

Figure 4:
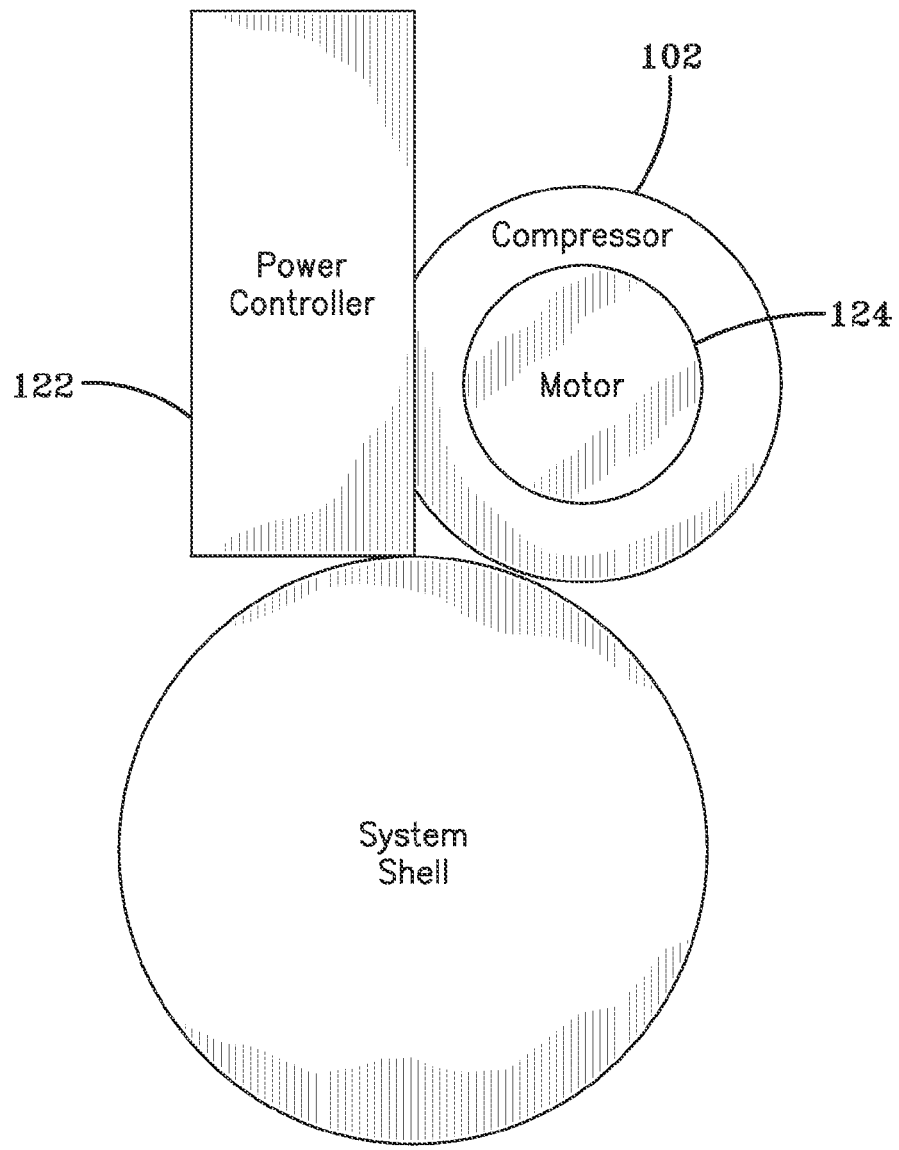
FIG. 4 shows schematically a partial end view of an embodiment of the power controller box being mounted on a chiller system.
Figure 5:
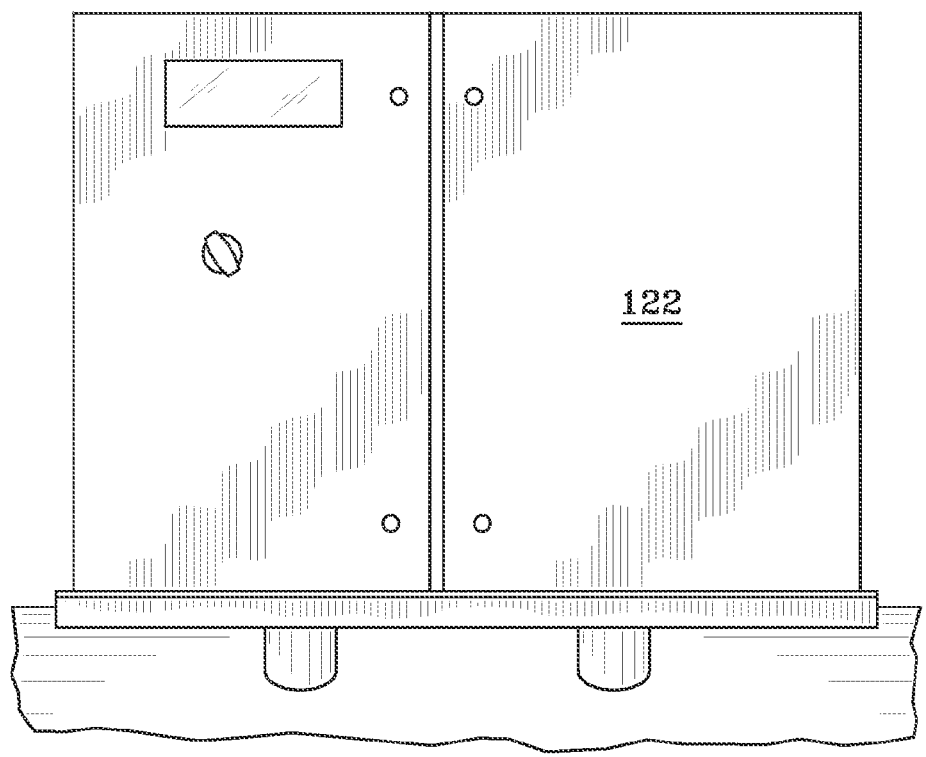
FIG. 5 shows a front view of an embodiment of the power controller box being mounted on a chiller system.
Figure 6:
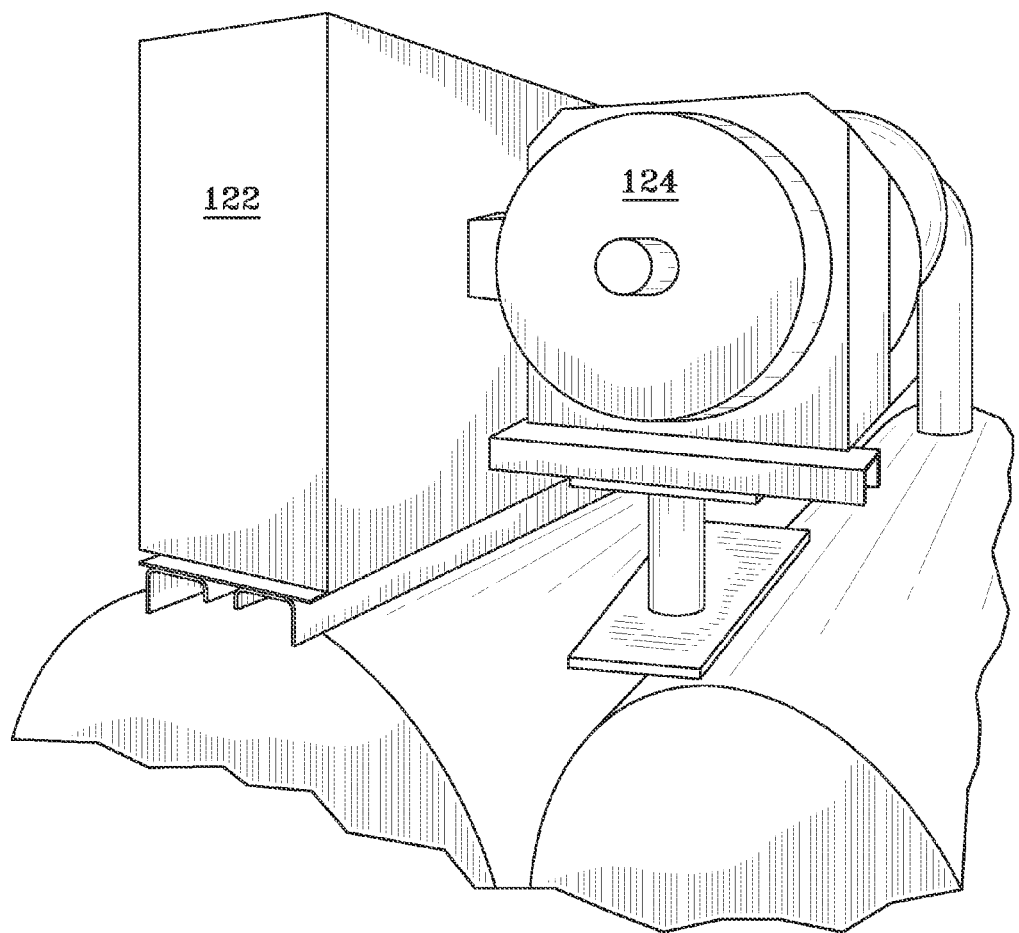
FIG. 6 shows an oblique view of an embodiment of the power controller box being mounted on a chiller system.
Figure 7:
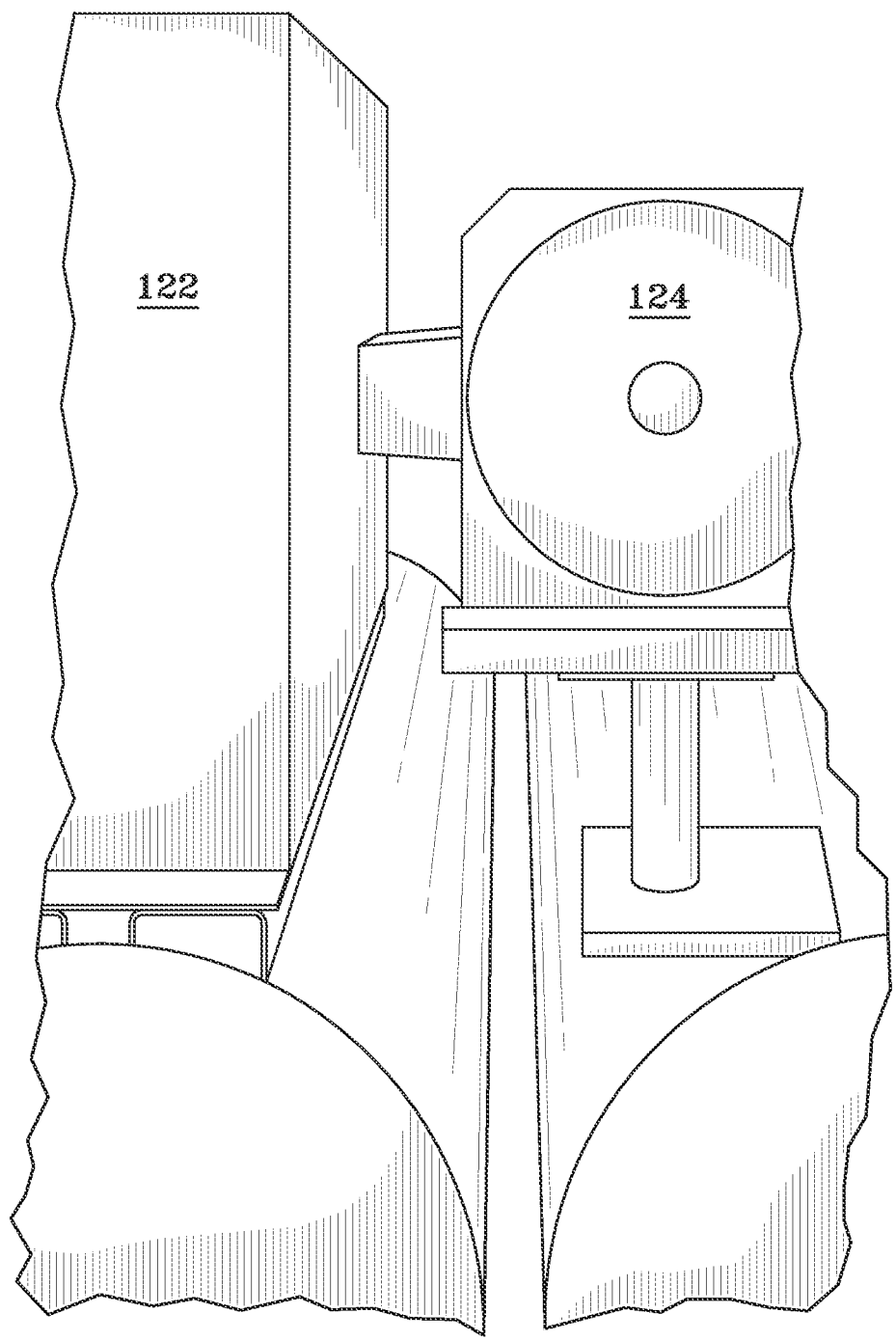
FIG. 7 shows a side view of an embodiment of the power controller box being mounted on a chiller system.
Figure 8:
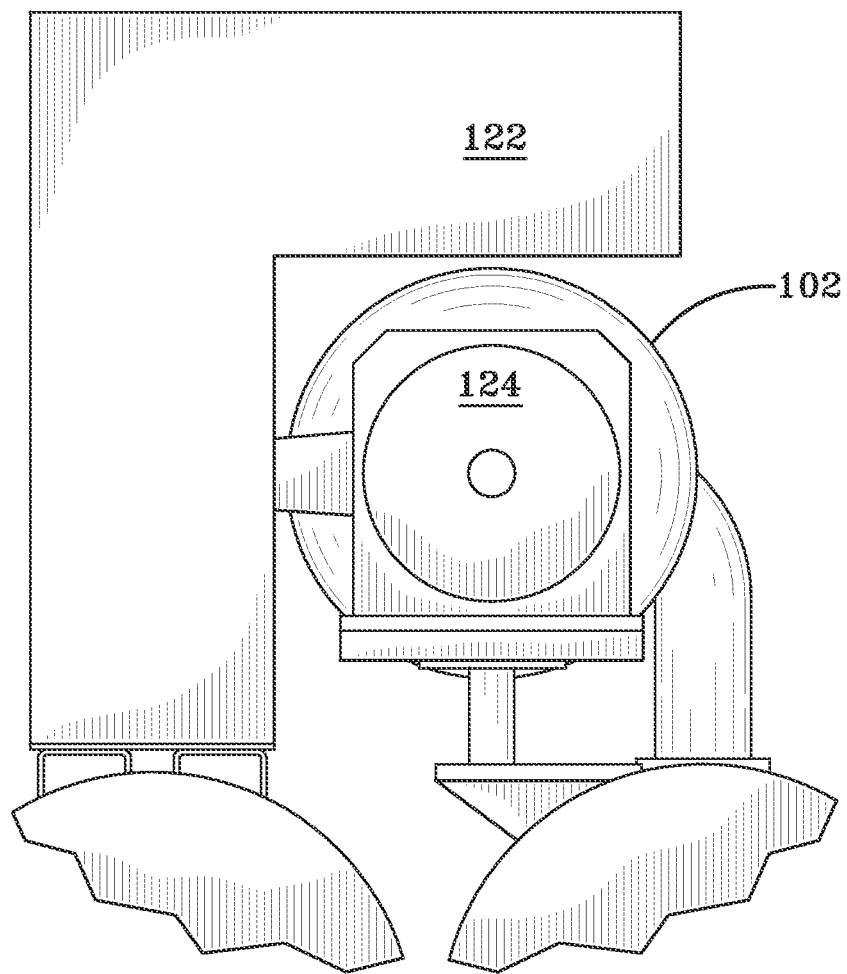
FIGS. 8 and 9 show schematically side views of different embodiments of the power controller box and motor.
Figure 9:
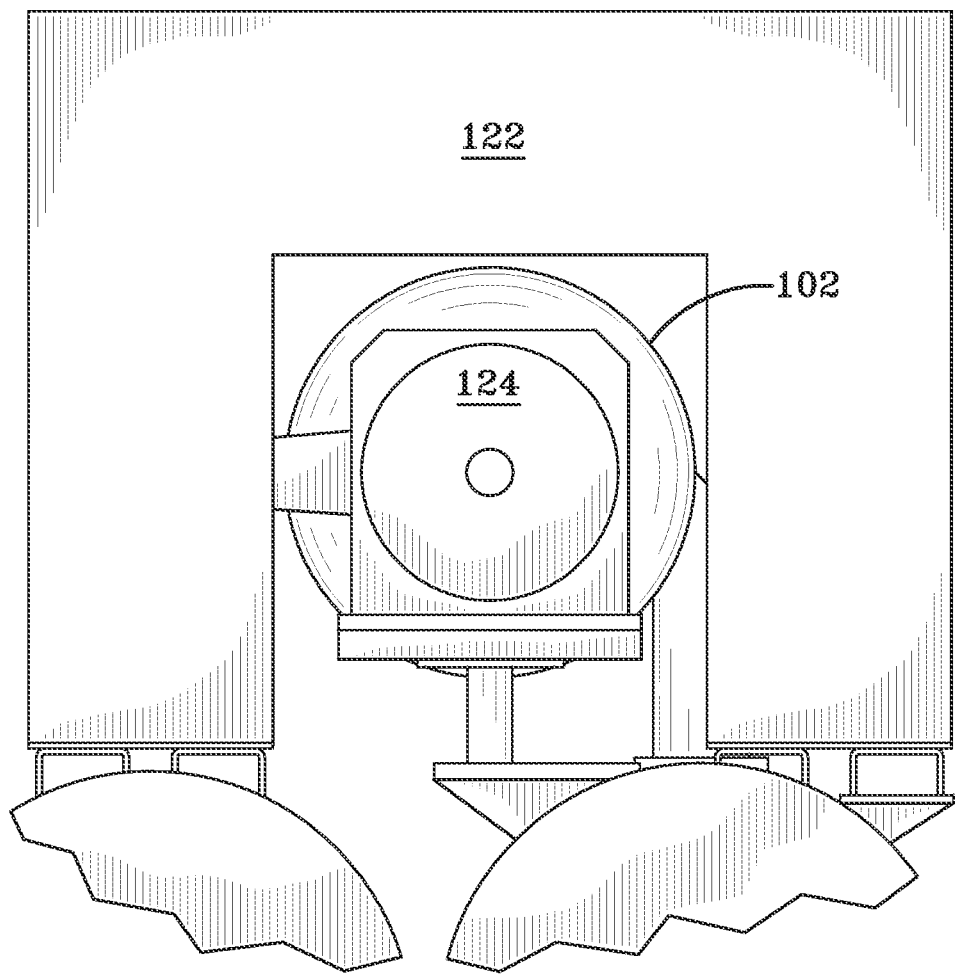
Figure 10:
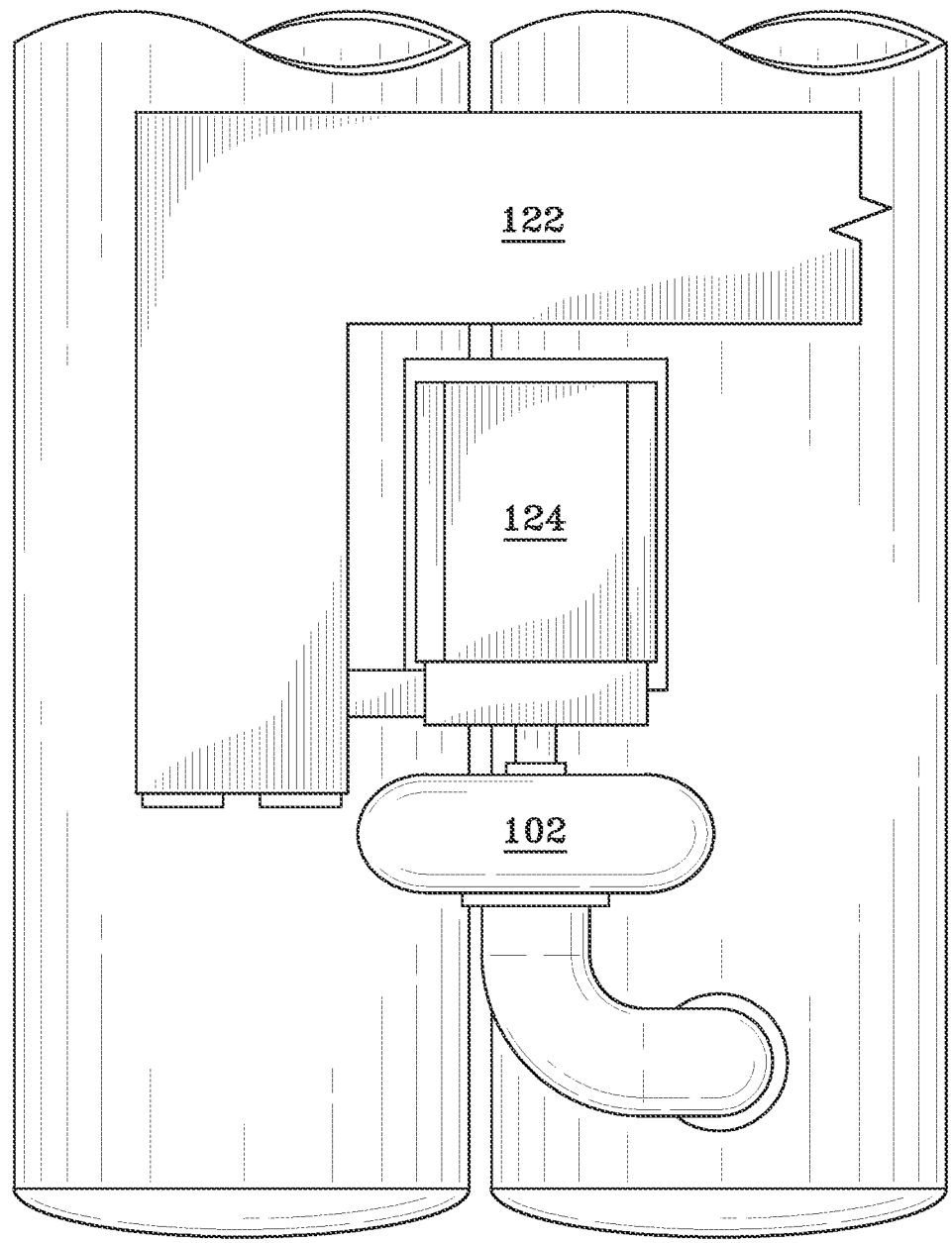
FIGS. 10 and 11 show schematically top views of different embodiments of the power controller box and motor.
Figure 11:
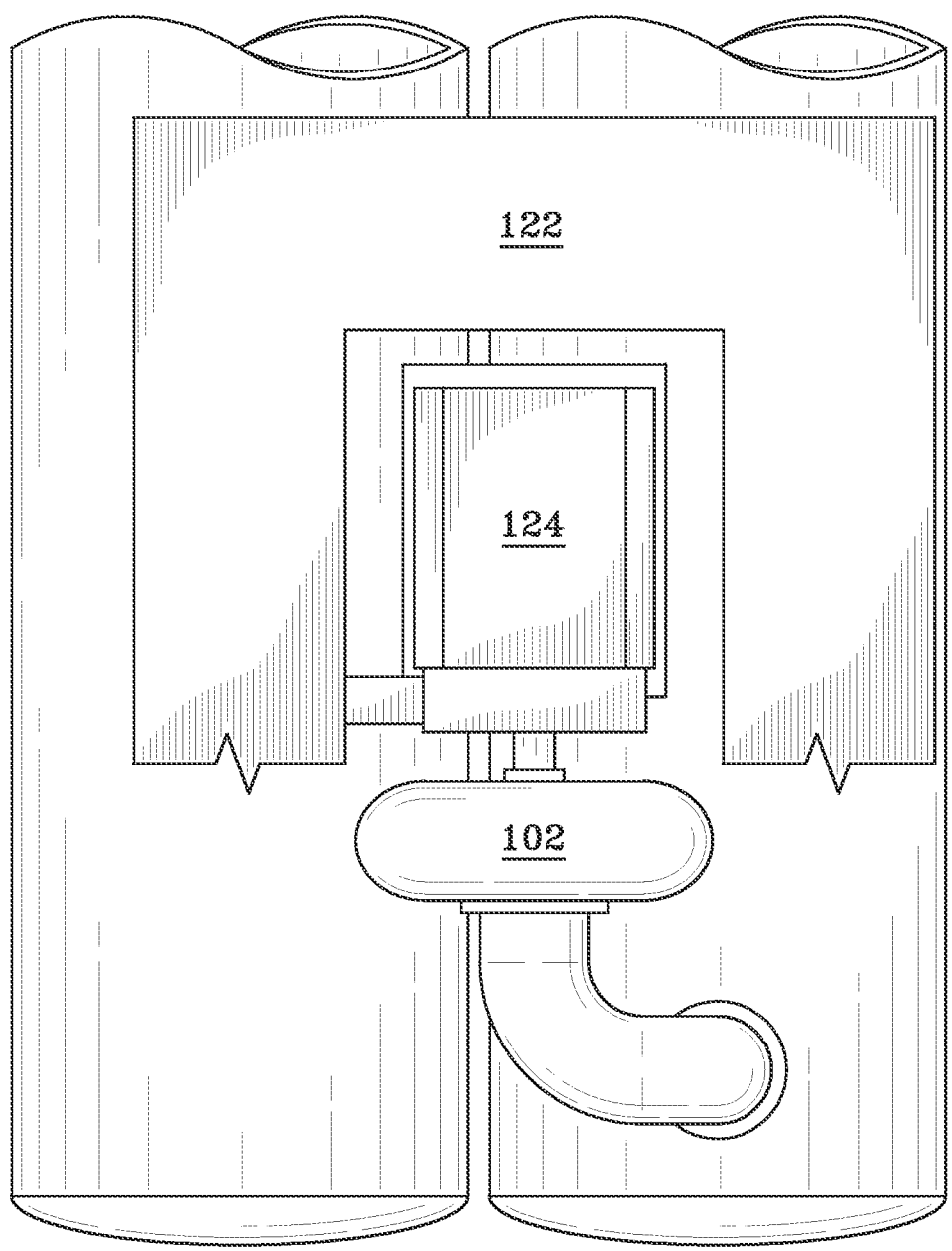

In addition, as shown in FIG. 4, the motor 124 and compressor 102 can be mounted on the same system shell as the power controller box 122 and control panel 108. However, in another embodiment, the motor 124 and compressor 102 can be mounted between the system shells using one or both of the system shells for support. In still a further embodiment, as shown in FIGS. 6 and 7, the motor 124 and compressor 102 can be mounted on the other system shell from the power controller box 122 and control panel 108.

Figure 13:
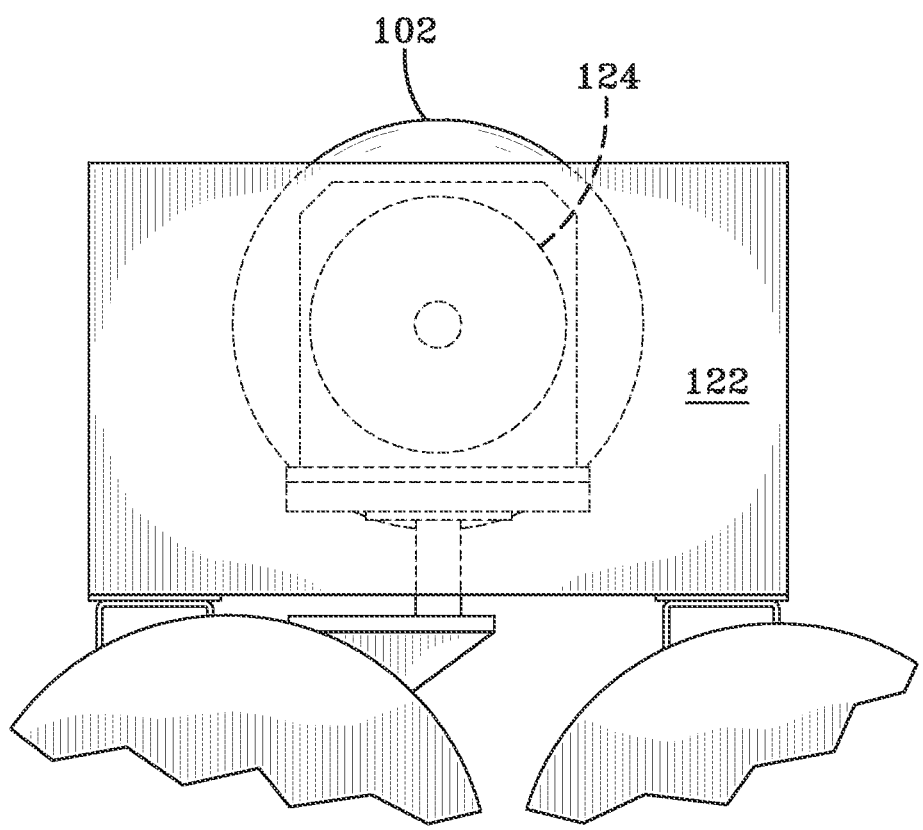
FIG. 13 shows schematically a perspective view of an integrated power controller box and motor.

In another embodiment, as shown in FIG. 13, the motor may be included inside the power controller box. The medium voltage power controller and medium voltage motor are integrated with one another in a single box or enclosure. Cooling for the motor and the power controller may be accomplished with refrigerant, water, e.g., condenser water, evaporator secondary liquid or process fluid, oil, or by the use of heat pipes. Using one or more cooling configurations can optimize the space available for all electrical and mechanical components.

Figure 2A:
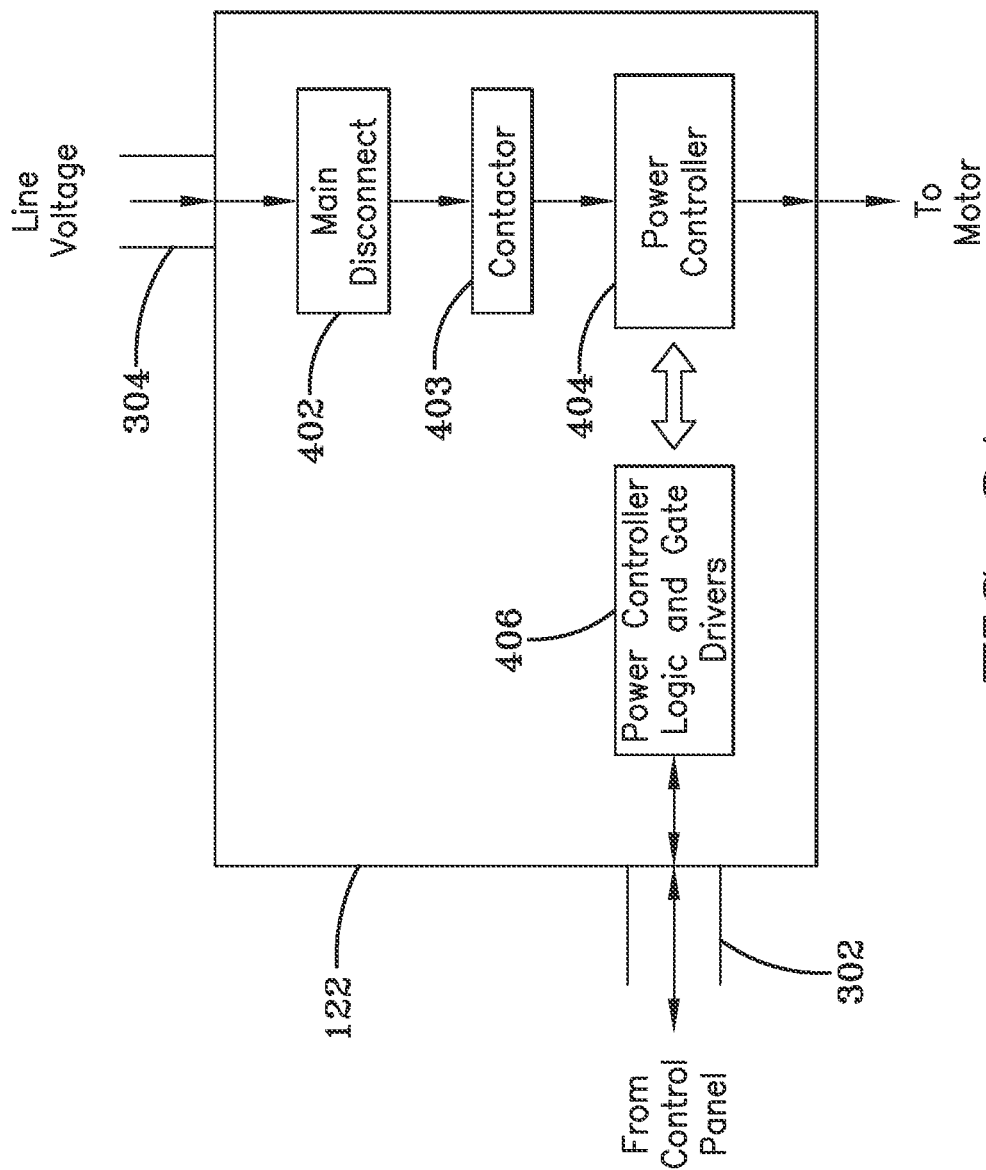
FIG. 2A shows one arrangement of a power controller box.
Figure 2B:
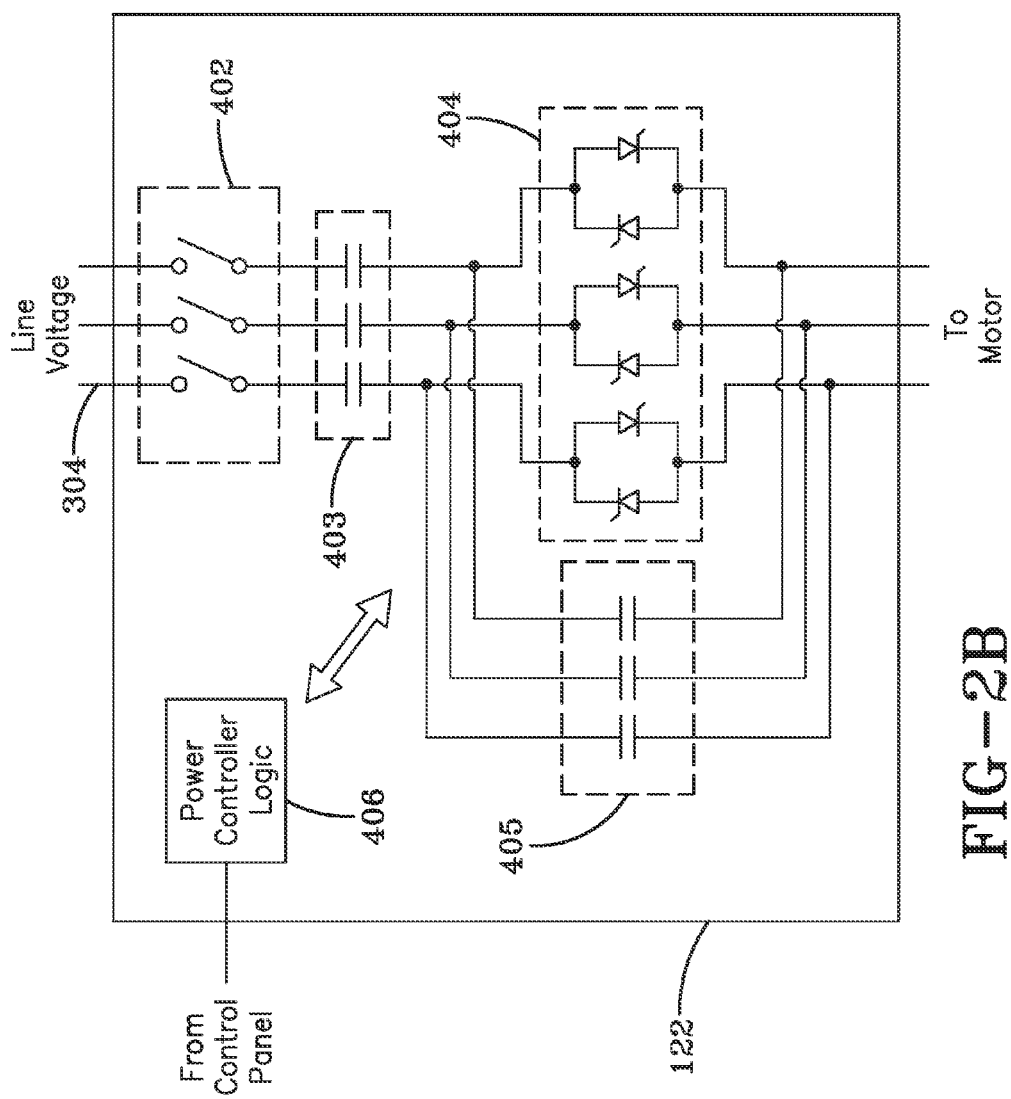
FIGS. 2B and 2C show alternative arrangements of a power controller box.
Figure 2C:
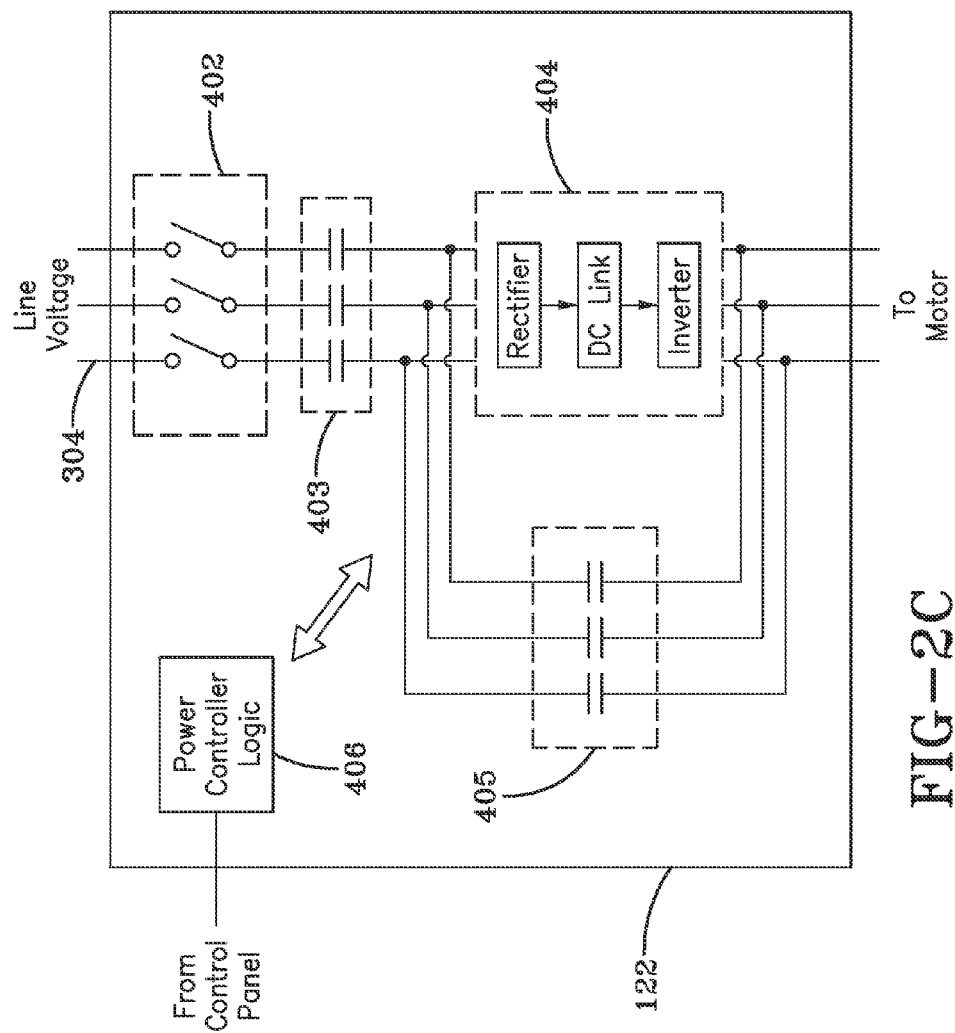

FIGS. 2A-2C illustrate configurations of some of the components of the power controller box 122. In FIG. 2A, the power connection 304 from the building electrical service is connected to the power controller box 122 and provides the medium voltage power or line voltage to a main disconnect switch 402. The main disconnect switch 402 can be used to disconnect the remaining components of the power controller box 122 from the line voltage for safety reasons or any other suitable reason. The main disconnect switch 402 is manually operated and can be accessed from the outside of the power controller box 122, thereby providing a mechanical safety interlock feature for the starter box 122. The main disconnect switch 402 is then connected to an electrical switching arrangement 403 that can also be used to disconnect power from the motor 124. The electrical switching arrangement 403 can be controlled directly by the control panel 108 or controlled indirectly by the control panel 108 through a power controller logic module 406 in the power controller box 122. The electrical switching arrangement 403 can be a contactor arrangement having vacuum switches controlled by a coil. However, it is to be understood that any suitable electrical switching arrangement can be used for the electrical switching arrangement 403. In another embodiment, if a line break disconnect switch or other electronic switch is used as the main disconnect switch 402, then the electrical switching arrangement 403 may not be required.

The electrical switching arrangement 403 is connected to a power controller device 404, which in turn is connected to the motor 124. The power controller device 404 can be used to "soft start" the motor 124 on an initial startup of the motor and then to permit variable speed operation of the motor 124 after startup. The power controller device 404 can incorporate semiconductor switches such as silicon controlled rectifiers (SCRs), insulated gate bipolar transistors (IGBTs), field effect transistors (FETs), diodes or gate turn off (GTO) devices. The power controller device 404 can be controlled directly by the control panel 108 or controlled indirectly by the control panel 108 through the power controller logic and gate drivers 406. In an exemplary embodiment, all components in the power controller box 122 requiring control connections are electrically connected or wired to the power controller logic 406 (not specifically shown in FIG. 2A), which power controller logic 406 then operates to facilitate communication between the components and the control panel 108.

FIGS. 2B and 2C illustrate other configurations of the power controller box 122. The configuration shown in FIG. 2B is similar to the configuration shown in FIG. 2A except that a bypass arrangement is included and the power controller device 404 is a starter. The power connection 304 from the building electrical service is connected to the power controller box 122 and provides the medium voltage power or line voltage to a main disconnect switch 402. The main disconnect switch 402 is then connected to an electrical switching arrangement 403 that can also be used to disconnect power from the motor 124. The electrical switching arrangement 403 is connected to a power controller device 404, which, in turn, is connected to the motor 124. The power controller logic 406 operates to facilitate communication between the components in the power controller box 122 and the control panel 108. In one embodiment, all components in the power controller box 122 requiring control connections are electrically connected or wired to the power controller logic 406 (not specifically shown in FIG. 2B), which power controller logic 406 then operates to facilitate communication between the components and the control panel 108.

The bypass arrangement is used to electrically bypass the solid-state starter version of the power controller device 404 after the motor 124 has been started to permit the motor 124 to be powered by the line voltage from the main disconnect 402. The bypass arrangement includes a second electrical switching arrangement 405 that can be used to provide line power to the motor 124 without having to use the solid-state starter of power controller device 404. By avoiding the use of the solid state starter of the power controller device 404 for normal operations and limiting its use to start-up operations, the amount of heat generated (and the amount of cooling that is required) in the power controller box 122 is reduced when compared to operating the solid-state starter of the power controller device 404 for both start-up and normal operations. The electrical switching arrangement 405 can be controlled directly by the control panel 108 or controlled indirectly by the control panel 108 through the starter logic module 406. The electrical switching arrangement 405 can be a contactor arrangement having vacuum switches controlled by a coil. However, it is to be understood that any suitable electrical switching arrangement can be used for the electrical switching arrangement 405. The configuration shown in FIG. 2C is similar to the configuration shown in FIG. 2B except that the power controller device 404 is a variable speed drive instead of a starter.

The power controller box 122 includes many other features, such as a lightning arrestor and the appropriate fuses and buses, that are not shown in FIGS. 2A-2C. The components of the power controller box 122 may be air cooled. In other embodiments, the components of the power controller box 122 can be cooled with cooling fluids from the chiller system 100, such as water (e.g., condenser water), evaporator process fluid, oil, or refrigerant, or by the use of heat pipes. The use of liquid cooling in the power controller box 122 can be used to enable physical size reduction of the power controller box. In still another embodiment, the power controller box 122 can also include the appropriate components, e.g., transformers, to power all motors on the chiller system unit including oil pump motors, cooling fluid pump motors, purge unit motors, fan motors, etc.

In another embodiment, some insulating methods used with the components of the power controller box 122 and/or the power controller box 122 itself to enable physical size reduction can include the use of potting material, oil, thermal dielectric fluid, vacuum, or inert pressurized gas.

In an exemplary embodiment where the power controller is a variable speed drive (VSD), the power controller box 122 can use multiple boxes or enclosures for the components of the VSD. The multiple boxes can be mounted at different locations on the unit or system and interconnected by conduit or be close coupled. In another embodiment, one or more boxes or enclosures for the components of a variable speed drive (VSD) can be unit or system mounted while one or more other boxes for the VSD components can be floor (or wall) mounted next to the unit or system. The use of multiple boxes may be necessary where all medium voltage components cannot fit into one box with the size necessary to mount on a particular chiller system configuration. In one embodiment, input fuses and disconnect switches, input transformer, input contactor, filter capacitors and rectifier sections could be placed or housed in one or more separate boxes and mounted at a distance from the motor. In another embodiment, the inverter section of the VSD could be housed in a unit mounted box and the rectifier section of the VSD could be housed in a floor mounted box.

Figure 14:
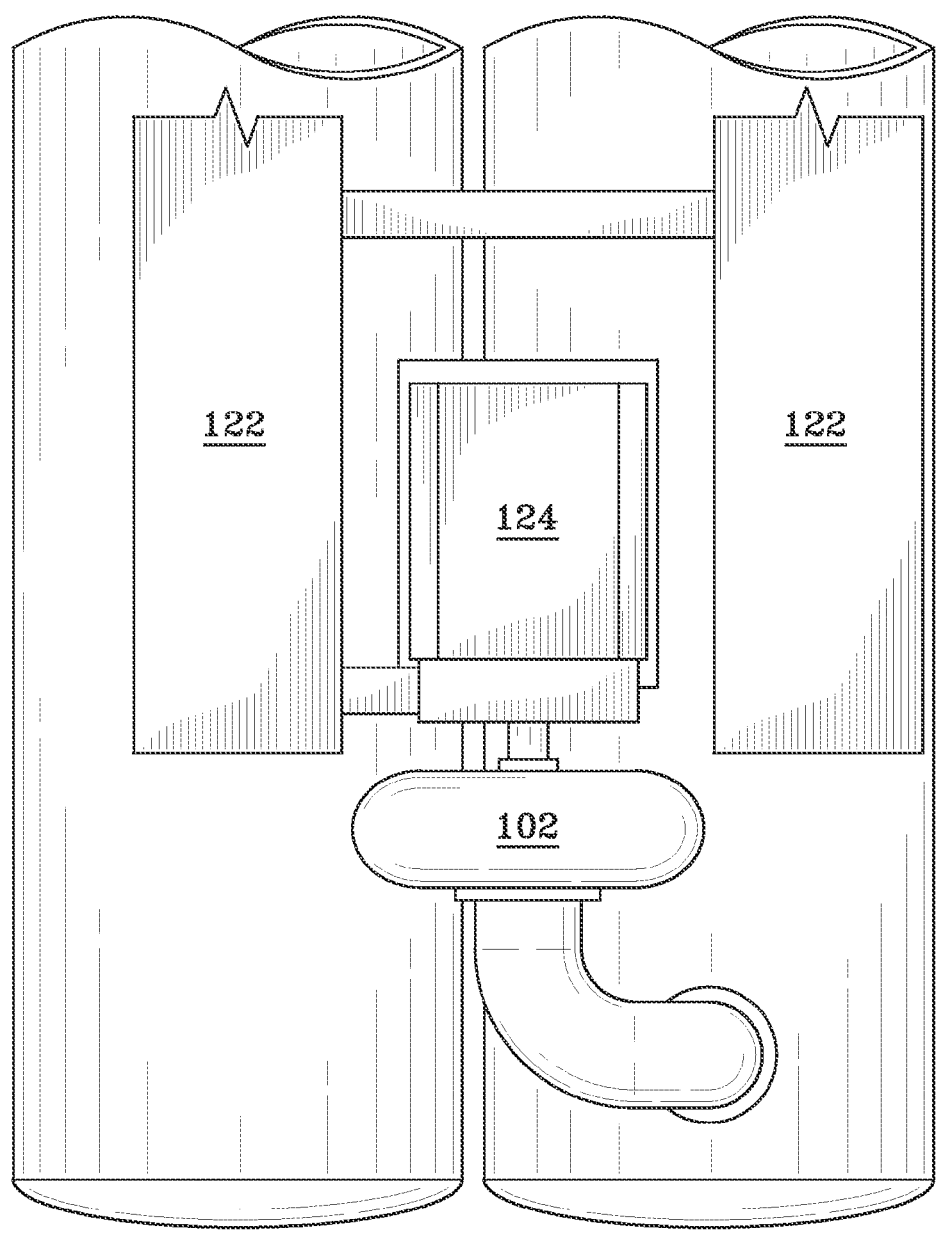
FIGS. 14 and 15 show schematically top views of different embodiments of multiple power controller box arrangements.
Figure 15:
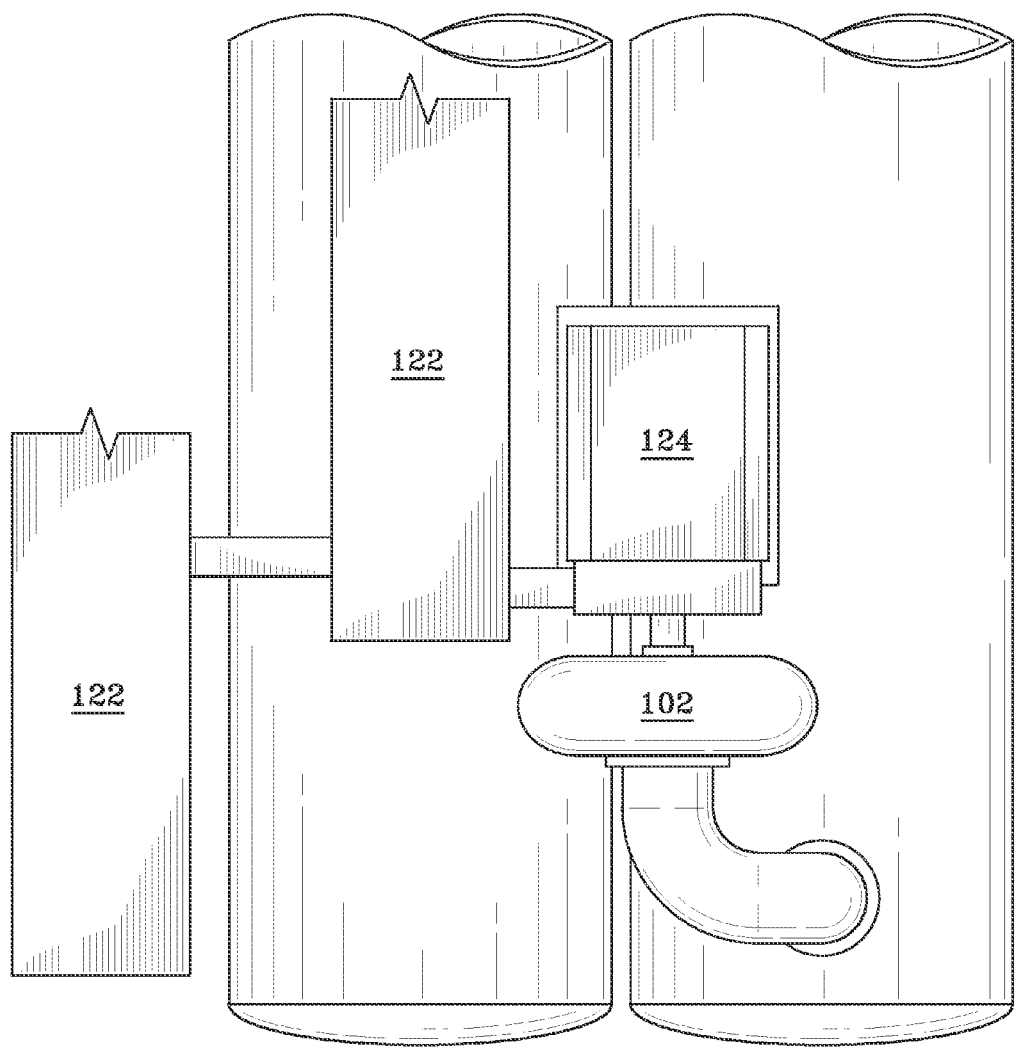

In another exemplary embodiment, the power controller box 122 can use two boxes or enclosures for the components of the variable speed drive. The two boxes can both be mounted on the unit or system (see e.g., FIG. 14) or one box can be mounted on the unit or system and the other box can be mounted next to the unit or system on the floor, wall or other mounting structure (see e.g., FIG. 15). In one embodiment, the input terminals, disconnect switch, and fuses for the VSD can be mounted in one box and the contactor, transformer, rectifier (either diodes or IGBTs), bus filter, inverter, output filter, and output terminals for the VSD can be mounted in the other box. In a second embodiment, the input terminals, disconnect switch, fuses, contactor, and transformer for the VSD can be mounted in one box and the rectifier (either diodes or IGBTs), bus filter, inverter, output filter, and output terminals for the VSD can be mounted in the other box. In a third embodiment, the input terminals, disconnect switch, fuses, contactor, transformer, and rectifier (either diodes or IGBTs) for the VSD can be mounted in one box and the bus filter, inverter, output filter, and output terminals for the VSD can be mounted in the other box. In a fourth embodiment, the input terminals, disconnect switch, fuses, contactor, transformer, rectifier (either diodes or IGBTs), and bus filter for the VSD can be mounted in one box and the inverter, output filter, and output terminals for the VSD can be mounted in the other box. In all four of the previously described embodiments, the box that contains the inverter can be mounted on the unit or system near the motor to avoid or prevent the use or requirement of electrical conduit connections between the unit mounted box and the medium voltage motor. Some factors that can be used to determine which embodiment is used and where VSD components are mounted can include the physical size of the two boxes or enclosures, the space available in the boxes or enclosures, the number of conductors to be used and electrical noise considerations.

In one exemplary embodiment, the power controller box can have an "L" shape over or around the end bell of the motor to provide more space for the components. In another embodiment, the motor could be located inside the power controller box. In still another embodiment, the power controller box can surround the motor with a "U" shape. For all of the different power controller box configurations, the motor heat must be dealt with since it cannot add to the heat load of the power controller box. FIGS. 8-11 show schematically different configurations of the power controller box relative to the motor.

Figure 12:
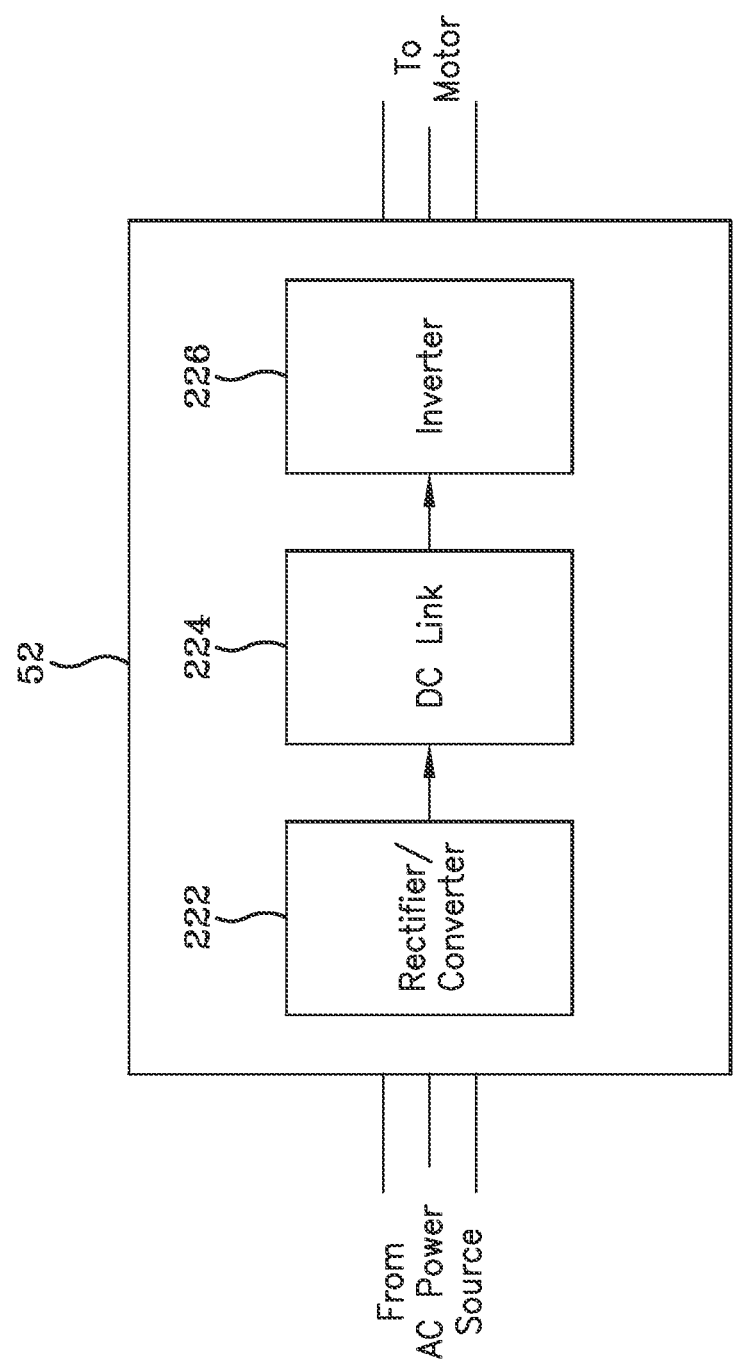
FIG. 12 shows schematically an exemplary embodiment of a variable speed drive.

FIG. 12 shows an exemplary embodiment of a VSD. The VSD 52 receives AC power having a particular fixed line voltage and a fixed line frequency from an AC power source and provides AC power to the motor 124 at a desired voltage and desired frequency, both of which can be varied to satisfy particular speed and torque requirements. The VSD 52 can have three components: a rectifier/converter 222, a DC link 224 and an inverter 226. The rectifier/converter 222 converts the fixed frequency and fixed magnitude AC voltage from the AC power source into DC voltage. The DC link 224 filters the DC power from the converter 222 and provides energy storage components such as capacitors and/or inductors. Finally, the inverter 226 converts the DC voltage from the DC link 224 into variable frequency and variable magnitude AC voltage for the motor 124.

In another exemplary embodiment, instead of mounting the disconnect switch and corresponding fusing in the power controller box, the disconnect switch and fusing in the building power distribution equipment can be used. By using the disconnect switch and fusing in the building power distribution equipment, a significant mechanical piece can be removed from a unit mounted drive or box. Such a configuration is permitted since the National Electrical Code states that the disconnect switch must be within sight of the chiller.

While the exemplary embodiments illustrated in the figures and described herein are presently preferred, it should be understood that these embodiments are offered by way of example only. Other substitutions, modifications, changes and omissions may be made in the design, operating conditions and arrangement of the exemplary embodiments without departing from the scope of the present application. Accordingly, the present application is not limited to a particular embodiment, but extends to various modifications that nevertheless fall within the scope of the appended claims. It should also be understood that the phraseology and terminology employed herein is for the purpose of description only and should not be regarded as limiting.

Only certain features and embodiments of the invention have been shown and described in the application and many modifications and changes may occur to those skilled in the art (e.g., variations in sizes, dimensions, structures, shapes and proportions of the various elements, values of parameters, mounting arrangements, use of materials, orientations, etc.) without materially departing from the novel teachings and advantages of the subject matter recited in the claims. For example, elements shown as integrally formed may be constructed of multiple parts or elements, the position of elements may be reversed or otherwise varied, and the nature or number of discrete elements or positions may be altered or varied. The order or sequence of any process or method steps may be varied or re-sequenced according to alternative embodiments. It is, therefore, to be understood that the appended claims are intended to cover all such modifications and changes as fall within the true spirit of the invention. Furthermore, in an effort to provide a concise description of the exemplary embodiments, all features of an actual implementation may not have been described (i.e., those unrelated to the presently contemplated best mode of carrying out the invention, or those unrelated to enabling the claimed invention). It should be appreciated that in the development of any such actual implementation, as in any engineering or design project, numerous implementation specific decisions may be made. Such a development effort might be complex and time consuming, but would nevertheless be a routine undertaking of design, fabrication, and manufacture for those of ordinary skill having the benefit of this disclosure, without undue experimentation.

What is claimed is:

1. A system comprising:
a compressor, a condenser and an evaporator in fluid communication;
the compressor, condenser and evaporator being mounted as a structure;
a motor connected to the compressor to drive the compressor, the motor being mounted on the structure, the motor being powered by a voltage greater than 600 volts; and
an enclosure comprising all components used in starting and operating the motor at variable speeds, the enclosure and components being configured for operation at voltages greater than 600 volts, the enclosure being mounted on the structure near the motor to permit electrical connections between the enclosure and the motor.

2. The system of claim 1 further comprising a cooling system to cool the components in the enclosure, the cooling system using at least one of air cooling, refrigerant cooling, liquid cooling or other cooling devices.

3. The system of claim 1 wherein the components of the enclosure comprise at least one of a power controller device, solid state starter device, variable speed drive, a main disconnect switch or a logic module.

4. The system of claim 3 wherein the power controller device comprises at least one switch selected from the group consisting of a silicon controlled rectifier, a gate turn off device, a field effect transistor, and an insulated gate bipolar transistor.

5. The system of claim 4 wherein the switches of the power controller device are electrically insulated from each other with at least one of potting material, oil, thermal dielectric fluid, vacuum, or inert pressurized gas.

6. The system of claim 3 wherein the power controller device is configured to provide a soft start or variable speed capability to the motor.

7. The system of claim 3 wherein the logic module receives control instructions from a control panel for the components in the enclosure.

8. The system of claim 3 wherein the main disconnect switch comprises a manually operated switch.

9. The system of claim 8 wherein the components comprise an electrical switch connected between the main disconnect switch and the solid state starter device or variable speed drive.

10. The system of claim 9 wherein the components comprise a bypass connection, the bypass connection being connected in parallel with the solid state starter device or variable speed drive between the electrical switch and the motor to bypass the solid state starter device or variable speed drive after the motor is started.

11. The system of claim 10 wherein the bypass connection comprises a second electrical switch.

12. The system of claim 1 further comprising a control panel, the control panel being operable to control operation of the components in the enclosure.

13. The system of claim 1 further comprising a control panel, the control panel being operable to provide control commands to the components in the enclosure.

14. The system of claim 1 wherein the enclosure and the motor are mounted on one component of the structure.

15. The system of claim 1 wherein the motor is mounted within the enclosure.

16. A system comprising:
a compressor, a condenser and an evaporator in fluid communication, the compressor, condenser and evaporator being mounted to form an integral unit;
a motor connected to the compressor to drive the compressor, the motor being mounted on the unit, the motor being powered by a voltage greater than 600 volts and less than 25,000 volts;
a control panel being mounted on the unit;
at least one box used in starting and operating the motor at a fixed speed or variable speed, the at least one box being mounted on the unit near the motor, the at least one box comprising:
a power controller positioned in the at least one box, the power controller comprising at least one silicon controlled rectifier, gate turn off device, field effect transistor, or insulated gate bipolar transistor, the power controller being electrically connected to the motor, the power controller being configured for operation at voltages in a range between 600 volts and 25,000 volts;
a disconnect switch being electrically connectable to a power source supplying a voltage greater than 600 volts and less than 25,000 volts;
a first electrical switch connected between the disconnect switch and the power controller, the first electrical switch being operable to be opened and closed in response to control instructions received from the control panel, the first electrical switch being configured for operation at voltages in a range between 600 volts and 25,000 volts; and
a second electrical switch being connected in parallel with the power controller between the first electrical switch and the motor to bypass the power controller after the motor is started, the second electrical switch being configured for operation at voltages in a range between 600 volts and 25,000 volts; and
wherein the at least one box is mounted on the unit to permit electrical connections between the at least one box and the motor without a separate power conduit connection between the at least one box and the motor.

17. The system of claim 16 wherein the at least one box comprises two or more boxes, each box of the two or more boxes housing at least one component, a first box of the two or more boxes being mounted on the unit to permit an electrical connection between the first box of the two or more boxes and the motor without using an electrical conduit connection, and a second box of the two or more boxes being mounted near the first box.

18. The system of claim 16 wherein the at least one box further comprises a module, the module being configured to receive control instructions from the control panel and provide control instructions to the first electrical switch, the second electrical switch and the at least one silicon controlled rectifier, gate turn off device, or insulated gate bipolar transistor.

19. The system of claim 16 wherein the at least one box and the motor are mounted on one component of the unit.

20. A system comprising:
a compressor, a condenser and an evaporator being integrally mounted as a unit;
a motor connected to the compressor to drive the compressor, the motor being mounted on the unit;
a control panel being mounted on the unit; and
a variable speed drive controlled by the control panel, the variable speed drive being configured to provide voltages to the motor in a range between 600 volts and 25,000 volts to operate the motor at variable speeds, the variable speed drive being mounted on the unit near the motor; and
wherein the variable speed drive is mounted on the unit to permit electrical connections between the variable speed drive and the motor without a power conduit connection between the variable speed drive and the motor.

21. The system of claim 20 wherein the control panel is configured to control power sections of the variable speed drive.

22. The system of claim 20 further comprising a main disconnect switch connected between the variable speed drive and a medium voltage electrical service, the main disconnect switch being mounted separate from the unit.

23. The system of claim 20 further comprising two or more boxes mounted on the unit, the two or more boxes each housing one or more components of the variable speed drive.

24. The system of claim 23 wherein at least one box of the two or more boxes is mounted on the unit to permit an electrical connection between the at least one box and the motor without using an electrical conduit connection.

* * * * *